United States Patent [19]
Smith

[11] Patent Number: 5,121,703
[45] Date of Patent: Jun. 16, 1992

[54] CLEAR VIEW HARD CURTAIN

[76] Inventor: Jeffrey L. Smith, 371 Alameda Parkway, Arnold, Md. 21146

[21] Appl. No.: 642,153

[22] Filed: Jan. 17, 1991

Related U.S. Application Data

[63] Continuation of Ser. No. 418,871, Oct. 10, 1989, abandoned.

[51] Int. Cl.$^5$ .............................................. B63B 17/00
[52] U.S. Cl. ................................. 114/361; 296/147
[58] Field of Search ............... 114/177, 361, 66; 296/107, 108, 138, 145, 147, 84.1, 86, 87; 135/88, 117

[56] References Cited

U.S. PATENT DOCUMENTS

| | | | |
|---|---|---|---|
| 1,067,660 | 7/1913 | Kay | 114/361 |
| 1,583,917 | 5/1926 | Donnelly | 296/145 |
| 2,243,981 | 11/1939 | Rowan . | |
| 2,423,748 | 7/1947 | Acheson | 296/107 |
| 2,638,378 | 1/1952 | Molinaro . | |
| 2,638,379 | 5/1953 | Spring | 296/145 |
| 2,733,747 | 7/1954 | Altschul . | |
| 2,803,282 | 7/1955 | Wilcox . | |
| 2,889,839 | 6/1959 | Sheridan, Jr. | 114/361 |
| 3,388,945 | 6/1968 | Kevelin et al. | 296/145 |
| 3,436,889 | 10/1966 | Jessee . | |
| 3,611,970 | 10/1971 | Hagan | 114/177 |
| 3,654,648 | 4/1972 | Wilhoit | 114/361 |
| 3,698,409 | 10/1972 | Koontz | 114/361 |
| 3,843,982 | 10/1974 | Lane et al. | 114/361 |
| 4,041,999 | 8/1977 | Miller . | |
| 4,122,887 | 10/1978 | Dussault et al. . | |
| 4,542,911 | 9/1985 | Mulligan . | |
| 4,547,014 | 10/1985 | Wicker . | |
| 4,639,033 | 1/1987 | Wheatley et al. . | |
| 4,824,161 | 4/1989 | Lee . | |

OTHER PUBLICATIONS

"Petersens 4 Wheel & Off-Road", Magazine, May 1988, p. 94.

Primary Examiner—Sherman Basinger

[57] ABSTRACT

The present invention is directed to a clear view hard curtain which is comprised of a plurality of separable frames, each frame including at least one semi-rigid clear, flat panel, and a flexible frame surrounding the panel. Each of a plurality of frames may be attachable to a vehicle to thereby form an enclosure protecting the interior of the vehicle from external natural elements. Finally, the enclosure may be maintained during operation of the vehicle with the flexible framing member absorbing shock to the semi-rigid panels which may be caused by the movement of the vehicle. Preferably, the clear view hard curtain may be utilized as a protective enclosure for the bridge of a boat.

50 Claims, 4 Drawing Sheets

CLEAR VIEW HARD CURTAIN

This application is a continuation of application Ser. No. 07/418,871 filed on Oct. 10, 1989, now abandoned.

The present invention relates to a protective cover for protecting the interior of a vehicle from various external natural elements, in general, and more particularly relates to a protective enclosure having a plurality of flexible, transparent frames containing both a transparent semi-ridged member and a flexible framing member.

BACKGROUND OF THE INVENTION

Various vehicle covers have existed over the years designed for a variety of purposes including the protection of vehicle interiors from the elements of nature. Certain automobile covers such as that to Altschul in U.S. Pat. No. 2,733,747, have been constructed from plastic material and have been designed so as to fairly conform with the vehicle and when placed over its top completely cover the vehicle. This type of cover allows for complete enclosure of the vehicle and thus works well in protecting it from the elements particularly where the vehicle remains idle.

Other types of covers were further developed which acted to protect selected portions of a vehicle. For example, the vehicle protector discussed in U.S. Pat. No. 4,041,999 to Miller, is directed to a vehicle protector which utilizes a plurality of plastic sheets, each having one surface thereof covered with a soft resilient material. This cover allows for the protection of the outermost surface of the front fenders, the front door panels, and the remaining side panels of the motor vehicle. Both elastic members as well as snap fasteners attach the cover to the vehicle. Thus, the structure and method of fabrication of this particular protector utilizes a plurality of flexible sheet members which cover selected portions of a body of a motor vehicle and are removably effected thereto by the snap fasteners and/or elastic members. Therefore, as can clearly be seen, prior vehicle covers for protecting a vehicle from the natural elements conformed to the exterior of the vehicle and protected the exterior from the natural elements.

Various boat covers have also been designed for protecting sea-going vessels from not only the natural elements of wind and rain, but also from the elements of the ocean when at sea. Attempts were made to utilize hard rigid glass panels on the bridge of a boat to allow the driver of a boat high visibility while still protecting the interior of the boat from the various elements of rain and seawater. However, in utilizing such an inflexible material such as glass, these types of covers were prone to cracking and breaking. If the boat were to move, the rigid panels of glass could not absorb the shock between the boat and the water. Further, though attempts were made to attach the glass to the exterior of the boat, this proved a difficult task. Attachments had to be made to secure the glass to the boat, while also attempting not to crack the glass.

Most boats of today have abandoned glass covers for protecting, for example, the bridge and aft of the boat. The generally used cover of today is comprised of a single clear vinyl sheet which attached to the exterior of the boat and utilized for protecting the interior of the boat from the natural elements of rain, and further, for protecting the interior of the boat while the boat is moving.

However, the use of clear vinyl boat covers has several drawbacks. One primary drawback in the utilization of clear vinyl covers is that clear vinyl wrinkles. Though initially smooth, the vinyl, being a flexible material, tends to wrinkle and thus develop lumps. These lumps make it difficult to clean the vinyl, and subsequently, over time, the visibility through the clear vinyl decreases. With decreased visibility, it is very difficult to utilize the vinyl covers while the boat is moving. The person driving the boat cannot see through these vinyl covers and thus must remove the cover and thereby remove his protection. The lumps and wrinkles in the vinyl also make it difficult to clean and subsequently, upon attempting to clean the vinyl, the vinyl scratches and deteriorates over time and actually loses visibility upon each attempt to clean.

The size of a vinyl cover also varies with temperature. When exposed to heat, vinyl expands and as it cools the vinyl contracts. This further makes vinyl more difficult to use when initially measuring a specific boat to be covered because it is very difficult to get the correct size of vinyl which is necessary to provide a cover for a particular portion of the boat. Also, for storage purposes, the vinyl must be folded each time the cover is taken off. Upon folding of the vinyl, it develops more wrinkles and creases and subsequently the visibility through the vinyl is further decreased.

Finally, one other drawback of vinyl boat covers exists in that normally, one continuous cover is utilized, for example, to cover the bridge of the boat. Therefore, if visibility is decreased for the driver, viewing from the interior of the boat out to the exterior of the boat, he must remove the entire cover in order to see. Therefore, the entire bridge of the boat is thus exposed to the natural elements due to the driver's inability to see out of the front of the boat.

SUMMARY OF THE INVENTION

The present invention is directed to a cover, which can be utilized for boats or other various vehicles, which solves the above-mentioned deficiencies known to have existed in prior protective covers. According to the teachings of the present invention, a protective cover has been developed which consists of a plurality of flexible frames, each frame comprising a semi-rigid panel. Thus, the teachings of the present invention solve the previously mentioned deficiencies of past protective covers, in that they allow for total protection from the elements as well as increased visibility from the interior of the vehicle to the exterior.

According to the teachings of one embodiment of the present invention, a boat cover has been developed in which transparent semi-rigid acrylic panels are utilized and are framed by flexible vinyl frames to thereby provide a flexible durable curtain which maintains a high degree of visibility from the interior of the boat to the exterior, and further provides for a cushioned shock absorbing flexible frame which allows the curtain to be maintained while the boat is moving through rough ocean water. The curtain further comprises means for detaching some of the frames to provide the user the flexibility of removing certain panels of the curtain while maintaining other panels of the curtain. Thus if the user desires some fresh air in the boat, he need not remove the entire curtain. The flat acrylic panels are also easily compactable, and when the curtain is removed and stored, subsequent utilization of the curtain will not resolve in deterioration of visibility through the curtain as was the case in the previous boat enclosures. Thus, a clearly superior flexible curtain has been developed to replace the previous vinyl boat covers.

OBJECTS OF THE INVENTION

It is therefore an object of the present invention to provide a boat cover which is made up of several flexible, transparent frames, to thereby provide a curtain with increased visibility due to the clear flat surface of the panels.

It is another object of the present invention to provide a vinyl frame around the acrylic panels, the vinyl frame allowing for the absorbing of shock to the acrylic panels when the cover is utilized on a moving vehicle.

It is a further object of the present invention to provide a cover for protecting the vehicle from the various natural elements which is easily cleanable and does not wrinkle, as compared to the previous vehicle covers, and therefore maintains excellent visibility over time.

It is a still further object of the present invention to provide a protective cover which utilizes several flexible, transparent frames, some of which may be nonfixably fashioned together, so as to allow for the removal of the certain flexible transparent frames while maintaining the remainder of the protective cover.

It is still a further object of the present invention to provide a protective cover which is easily compactable, foldable in an accordion-like manner, and adaptable for utilization on other vehicles such as tractors.

These and further objects of the present invention will become more readily apparent from a better understanding of the preferred embodiments described below with references to the following drawings figures.

BRIEF DESCRIPTION OF THE DRAWINGS

In the drawings, like numerals will be used to represent like elements throughout the drawings.

The present invention will become more fully understood from the detailed description given hereinbelow and the accompanying drawings which are given by way of illustration only and are not intended to limit the present invention, and wherein.

The above-mentioned drawings will be described in detail in the following detailed description.

DETAILED DESCRIPTION OF THE PREFERRED EMBODIMENT

The present invention will be described with reference to a general description of the clear view hard curtain and its applicability as a boat cover. However, though the preferred embodiment contemplates the use of the clear view hard curtain as a boat bridge enclosure, use of the clear view hard curtain is not limited to enclosures for boats. This clear view hard curtain can be used as a cover or enclosure for a variety of different vehicles.

Figure 1:
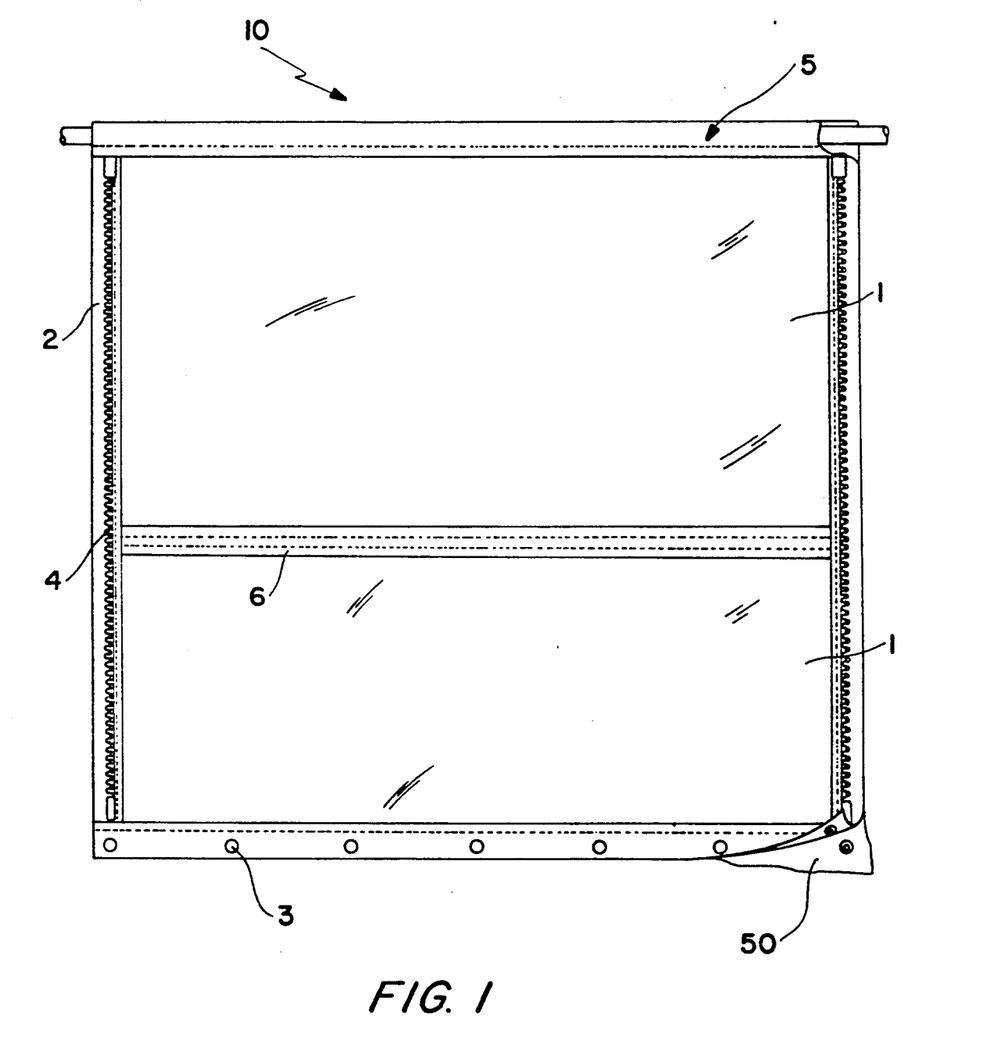
FIG. 1 illustrates the clear view hard curtain and the various components which make up the curtain.

FIG. 1 illustrates one preferred embodiment of the clear view hard curtain. The curtain includes hard, clear, flat, panels 1 which are preferably made of an acrylic material. These panels are utilized to create a surface which is highly protective and also allows for a high level of visibility through the panels. Still further, in utilizing an acrylic flat panel as opposed to the clear vinyl curtains, the acrylic panel is easily cleanable and does not scratch as readily as the clear vinyl curtains. Also, the flat panel allows for undistorted visibility and unlike a clear vinyl curtain, the acrylic panels stay rigid and thus do not form ridges and valleys which distort visibility. Though the acrylic panels may not stay free of scratches during the entire lifetime of the curtain, the acrylic may be buffed and cleaned to remove any minor scratches Cleaning the acrylic increases its visibility wherein cleaning clear vinyl sheet curtain tends to decrease visibility by increasing the number of scratches.

The second major component of the clear view hard curtain, as shown in FIG. 1, is the flexible frame 2 which surrounds the clear flat Panels 1. This flexible frame 2 is preferably made of a polyvinyl chloride (PVC) coated vinyl material This vinyl material frame 2 connected to and framing or encasing the clear flat Panels 1 allows for a flexible border around the panels 1. This flexible border is utilized to absorb any impact to the semi-rigid panels 1 and thus absorb shock which may be applied to the panels 1. The vinyl 2, being flexible, takes much of the stress off of the more rigid flat panels 1. The vinyl border 2 encasing the acrylic panels 1 also serves as a flexible member which can be penetrated to thereby allow the clear view hard curtain to include various means to connect multiple frames together and further to connect each of the frames to a vehicle to thereby allow the curtain to act as an enclosure to protect the vehicle.

As shown in FIG. 1, metal snaps 3 can be used to connect the clear view hard curtain to a vehicle such as a boat 50 to allow the curtain to enclose a portion of a boat 50 and Protect it from the elements of nature. The vinyl 2, being easily permeable, yet strong and resilient, can hold the snaps 3 and thus allow the frame of the curtain to be attached to a vehicle. Further, the vinyl 2 is also flexible enough to allow some expandability of the frame and thus absorb any shock applied to the frame. Although snaps 3 are described as a means for attaching the frame of the curtain to a vehicle, any similar means, such as hooks, elastic bands, etc., can be used to attach the frame and thus the invention is not limited to the snaps 3 described. Further, although metal snaps are described, snaps of any material may be utilized.

Though one frame 10 of the clear view hard curtain has been previously described, the curtain may consist of any number of a multiple of these frames. Preferably, as shown in FIG. 1, a zipper 4 may be utilized to connect each of the frames of the clear view hard curtain together. The zipper 4 is sewn into the flexible vinyl frame 2, and acts as a secure means to hold a plurality of frames together. Though a zipper has been described and shown in FIG. 1, various other means may be utilized to attach multiple frames together. For example, snaps may be used or even a metal track 5 may be used. The track 5 allows for a rigid bar in one frame to slide into a hollow grove in a second frame, thus attaching the two frames together.

Finally, as shown in FIG. 1, a hinge 6 may be created to separate a plurality of clear flat panels comprised in any one frame 10. As shown in FIG. 1, there are two acrylic panels 1, separated by the hinge 6. This hinge 6, in connection with the snaps 3, allows a user of the clear view hard curtain to detach one portion of the frame, while a second portion (panel) remains attached. (See FIG. 3 for example to be described hereinbelow.) Further, in a preferred embodiment to be described later, the hinge allows the user of the cover, on a boat, to easily detach and store the large two paneled frame shown in FIG. 1 in a compact area. Thus, for compactability and easy storage, a hinge 6 may be provided between two panels 1 in each of the desired frames 10 of the clear view hard curtain, and thus allow the user to fold each of the panels in half and store in a accordion-like manner. This is possible due to the fact that each of the frames 10 are detachable from each other, by means of the zipper 4, for example, and are further detachable from the vehicle, by means of the snaps 3. Thus, an example of one frame 10 of the clear view hard curtain of the present invention has been described.

In the method for creating the clear view hard curtain, it is first noted that the clear flat panel, acrylic sheet, is initially cut to the desired size. As shown in FIG. 1, the acrylic sheet is Preferably cut into a rectangular shape but is not limited to such a shape. Depending on the desired use for the cover or the enclosure, the acrylic sheet may be cut to any desired size or shape. Next the flexible frame, preferably vinyl, will now be described as well as its subsequent connection to the acrylic panel.

Figure 2A:
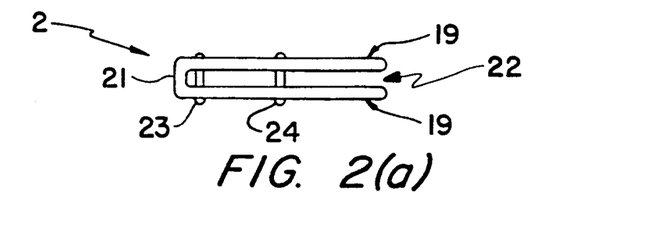
FIGS. 2A-E illustrate the relationship between the clear view hard curtain and the acrylic panels in connection with the vinyl forming the clear view hard curtain.
Figure 2B:
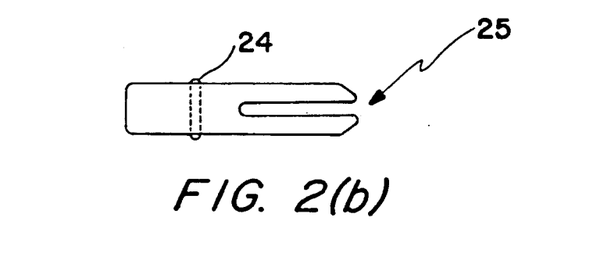

Initially, the vinyl 2 is laid flat, each portion of the frame cut to its desired size. The vinyl 2 is then folded in half, such that it now comprises a closed folded side 21 and an open unfolded side 22. The closed folded side 21 is then stitched and further, the midpoint of the fold is also stitched. The closed end 21 and open end 22, as well as the closed end stitch 23 and midpoint stitch 24 can be seen in FIG. 2A. Subsequently, the open end 22 of the vinyl 2, both the top and bottom portions, are folded back towards the midpoint stitch such that the smooth flat portion (PVC-coated sides 19 shown in. FIG. 2a) of the vinyl material is then exposed on both the top and bottom portions of both the top and bottom folds. Thus, both the top and bottom portions of the open end are folded in half. Then each fold is stitched so as to form a top portion and a bottom portion. Thereby, both portions have a smooth top side and a smooth bottom side (PVC-coated sides 19 as shown in FIG. 2b). This pocket is clearly shown with reference to FIG. 2B. As shown in FIG. 2B, a pocket 25 has now been formed with regard to the open end of the vinyl. This pocket 25, once formed, is now stitched to create a permanent pocket.

In a preferred embodiment, the vinyl 2 utilized is that of a Polyvinyl chloride (PVC) coated vinyl. In utilizing PVC-coated vinyl, one side of the vinyl is PVC-coated 19 and the other side is not. Thus, in folding the vinyl 2 as shown in FIG. 2A, the vinyl is folded such that the PVC-coated side 19 is now on the exterior of the fold, as shown in FIG. 2A. Further, with reference to FIG. 2B, each of the folds made which form the pocket 25 in the vinyl 2, are folded such that the PVC-coated side 19 of the vinyl now forms both the exterior and the interior of the Pocket 25. Therefore, when material is inserted into this pocket, it will be in contact with the PVC-coated side of the vinyl 2.

Figure 2C:
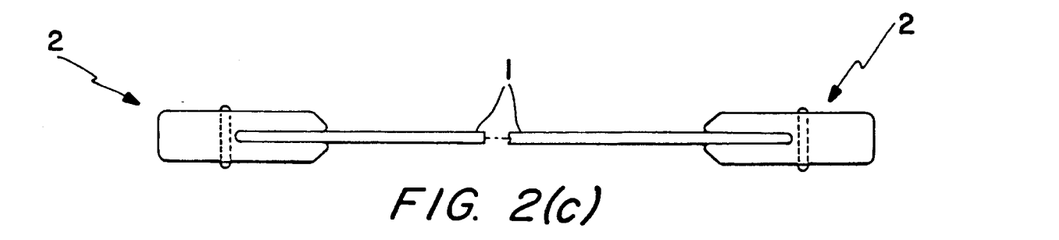

The clear flat panel 1 is then inserted into the previously formed PVC-coated vinyl pocket 25. As shown in FIG. 2C, the panel 1, preferably an acrylic panel, is glued into pockets 25 of the vinyl frame 2. Each portion of the panel 1 is then glued such that the vinyl frame 2 completely surrounds the acrylic panel 1. Though acrylic glue may be utilized as shown in this preferred embodiment, for attaching the panel 1 to the vinyl frame 2, any similar material may be utilized.

Figure 2D:
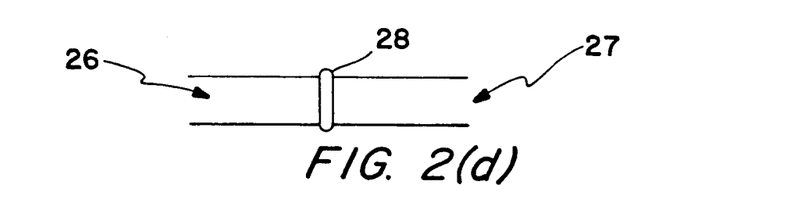
Figure 2E:
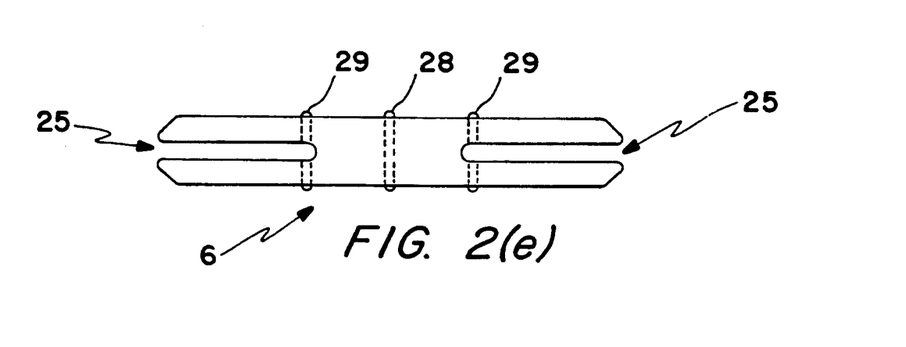

With regard to FIGS. 2D and 2E, the hinge 6 is formed in a similar manner to that of the pockets 25 as previously described. Initially, the vinyl 2 is laid flat and folded in half such that the PVC-coated side of the vinyl 2 is exposed on the top and the bottom. Then, the midpoint 28 of the folded vinyl is then stitched, as shown in FIG. 2D and the closed end 27 of the folded vinyl is then cut thereby forming open ends on both sides 26 and 27 of the vinyl 2. This is shown in FIG. 2D. Finally, in a similar method as Previously described with regard to the pockets 25 of FIG. 2B, pockets are formed on both sides of the midpoint stitch 28 (see FIG. 2E). Thus, the PVC-coated side of the vinyl 2 is folded such that pockets 25 are formed on either side of the midpoint 28, the pockets folded such that the PVC-coated side of the vinyl 2 forms the lining of each of the pockets 25. Each of the folded top and bottom portions of each pocket 25 are then stitched (and shown by 29 of FIG. 2E) such that a pocket 25 is now formed on either side of the midpoint, as shown in FIG. 2E. Therefore, a hinge 6 is then formed around the midpoint of the two pockets. The width of this hinge 6 thus formed may be varied as desired. The varying on the width of the hinge 6 depends upon when folding back the vinyl 2 to form each of the pockets 25, how far back each of these pockets 25 are folded. When the user determines this width, the PVC-coated side of the vinyl is then folded to thereby form the pocket 25 and this fold is stitched.

Finally, upon completing the hinge 6 and its pockets, the acrylic panels 1 may be bonded by glue, in a similar manner as Previously described, into each of the pockets. Therefore, a hinge 6 as shown in FIG. 1, may be formed between two acrylic panels 1.

In a similar manner, a track 5 may be formed, to connect a plurality of frames 10 together, in the same manner as the hinge 6. Once the two pockets 25 are formed, in one pocket is bonded a rail, and in another pocket may be bonded a track 5 (not shown). Then, in the frame 10 to be placed next to this frame 10, a track 5 is bonded opposite the rail in the previous frame 10. Thus, the rail of one frame can slide into the track 5 of the next frame, thereby connecting the two. This track 5 may be utilized as a substitute for the zipper 4 for connecting each of the frames 10 together. Further, for connecting a plurality of frames 10 to form the hard curtain, any combination of the tracks 5, the zipper 6 or snaps can be utilized to connect any or each of the plurality of frames together.

The present invention will now be described in its preferred embodiment with reference to FIGS. 3, 4 and 5, describing the use of the clear view hard curtain as an enclosure for use on a boat, for protecting the interior of the boat from the external elements of nature.

Figure 3:
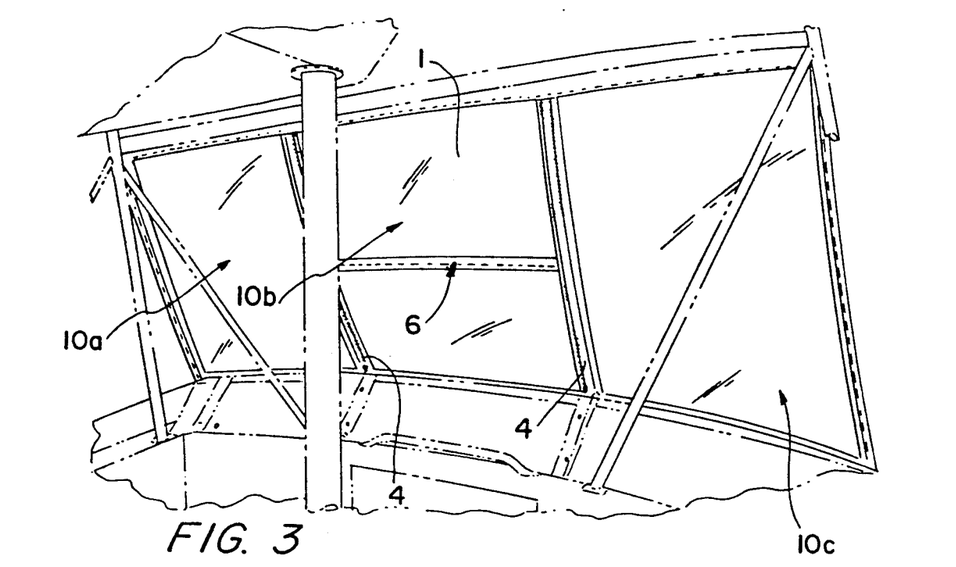
FIG. 3 illustrates the clear view hard curtain utilized, for example, for a bridge enclosure on a boat.

As FIG. 3 illustrates, the clear view hard curtain 30 can be utilized to enclose the bridge of a boat and protect the interior of the boat from the elements of nature such as wind and rain. FIG. 3 shows three frames 10 a, b, and c of the clear view hard curtain 30, each frame 10 attached to the other by means of a zipper 4, with the center frame containing two acrylic panels 1 separated by a hinge 6. In such a preferred embodiment, the driver of the boat, sitting in the bridge thus can utilize the high visibility of the clear view hard curtain 30 in navigating the boat. Thus, the clear view hard curtain 30 may be maintained during operation of the boat and, while the boat is moving. The clear view hard curtain 30 further protects the driver of the boat from the water of the sea or ocean upon which the boat may be driven, as well as the various natural elements of rain and water. The flat paneled surface of the clear view hard curtain 30 allows the driver high visibility as he controls the boat and the flat surface of the panels allows for any water contacted therewith, to easily roll down the panels and thus not hamper visibility. As previously described, the previous devices utilized clear vinyl which, over time, became wrinkled, hazy and thus limited the visibility through its surface. Therefore, the driver of the boat would have to remove such a cover during operation of the boat, and thus the interior of the boat could not be protected while the boat was being driven. Further, with regard to the acrylic panels 1, these panels 1 are of such material that they may be tinted such that only a limited amount of sunlight will enter the interior of the boat. This further will increase the driver's visibility during operation of the boat.

Finally, the flexible vinyl frame 2 surrounding the rigid acrylic panels 1 allows the acrylic panels to absorb little or no shock. The vinyl 2 stretches and thus during operation of the boat, even in rough waters such as the ocean, the vinyl 2 will create a cushion around the acrylic panels 1. Further, the Panels 1, though rigid, are still made of a flexible acrylic material such they they can take what little shock the vinyl 2 does not absorb without cracking. Therefore, with the panels 1 being flat yet semi-flexible, they allow for clear visibility without the fear of breaking. This would be the case if glass panels, for example, were utilized. The panels 1, as previously described, are made of an acrylic material in a preferred embodiment, but may be made of any flexible plexiglass type material and further may be comprised of a polycarbonate resin material such as "LEXAN". The LEXAN material creates an increased protective cover which is potentially bullet-proof and can absorb great pounding. This LEXAN material may be utilized, in an alternate embodiment for an enclosure of a tractor or similar-type vehicle which requires a stronger panel.

Figure 6:
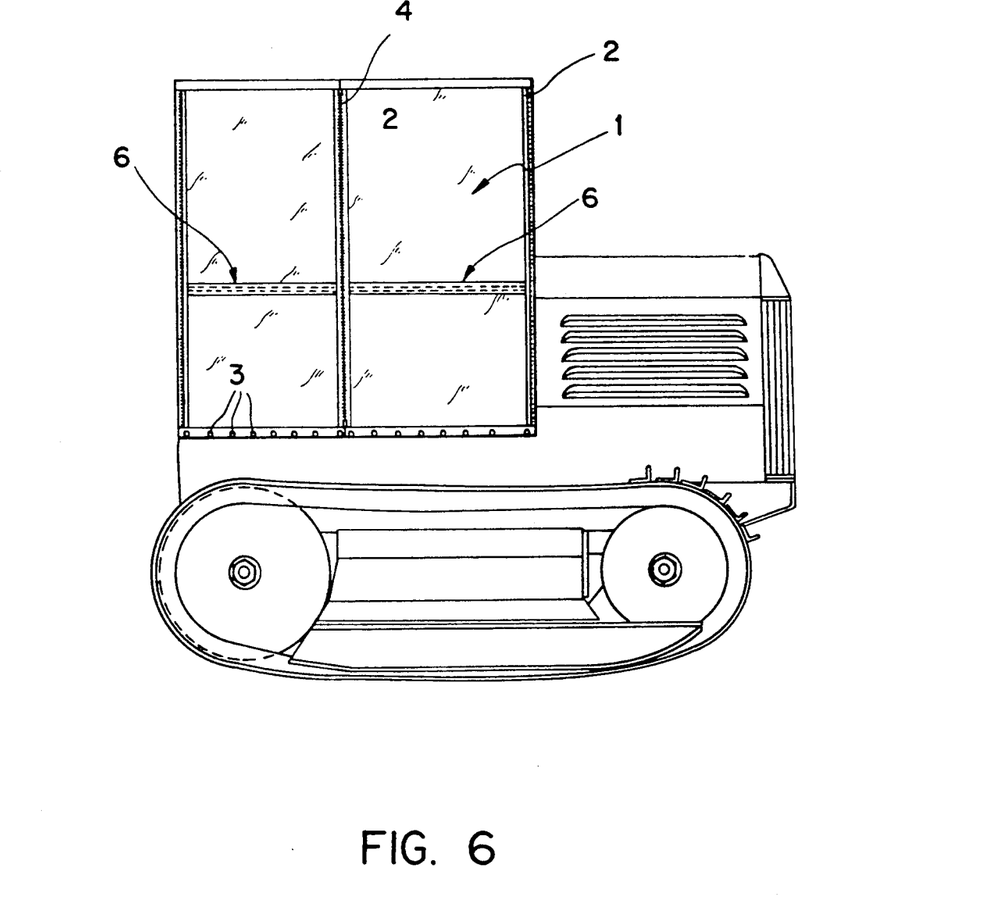
FIG. 6 illustrates the clear view hard curtain utilized on a tractor.

In utilizing the clear view hard curtain on a tractor, for example, the curtain is formed and attached to the tractor in a similar manner as previously described with regard to a boat. One difference in the formation being a substitution of the LEXAN panel for the acrylic panel. Further, the clear view hard curtain may be attached to a tractor in a similar manner as previously described regarding a boat. An example of the clear view hard curtain attached to the tractor can be seen with regard to FIG. 6.

Figure 4:
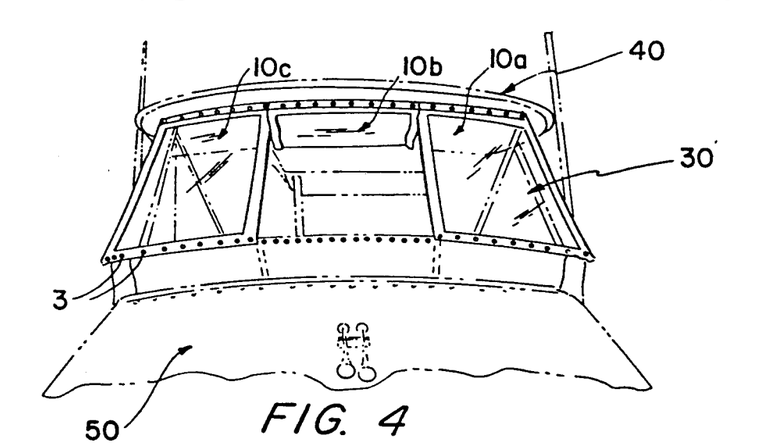
FIG. 4 illustrates a frontal view of the curtain for enclosing the bridge of a boat.

FIG. 4 shows a frontal view of a clear view hard curtain 30 attached to the bridge 40 of a boat 50. As can clearly be seen, the outer frames of the three shown in FIG. 4 (10 a, b, and c) are connected to the boat 50 by means of snaps 3. The middle frame 10b, preferably located in front of the driver of the boat 50, to that shown in FIG. 3. This frame 10b, as is similar to that shown in FIG. 3. This frame 10b, as shown in FIG. 3, includes a hinge 6 which allows the driver of the boat to easily detach this frame 10b and subsequently fold it in an accordion-like manner to be stored if not needed. As can be seen in FIG. 4, the hinge 6, allows for the detaching of the bottom snaps of the frame 10b, and further folding the frame in half and attaching the snaps to the upper portion of the bridge 40. Therefore, the center frame 10b can be temporarily stored in a similar manner to that of a sun visor in a car. Then, if later it is necessary, due to rough water or increasing rain, the driver of the boat 50 need only detach the snaps and fold down the hinged frame 10b, thereby replacing the center frame 10b to a state shown in FIG. 3. Further, in removing the center frame 10b and folding it as shown in FIG. 4, the driver must first detach the center frame 10b from the two outer frames 10a and 10c by means of unzipping the zippers 4, as shown in FIG. 3. Thus, any number of frames 10 as desired by the user of the boat employing the hard curtain 30, may be formed in a similar manner to that the hinged center frame 10b shown in FIG. 3. This provides the user of the boat to quickly and conveniently store any number of the frames 10 temporarily, without completely removing the enclosure. Further, by having separately detachable panels 10 in the clear view hard curtain 30, only a portion of the curtain which is desired may be utilized, instead of utilizing the entire clear vinyl curtains as was the case in Previous covers. Thus, if the user of the boat desires a slight breeze, but rough waters require the front of the boat to be protected, he need only remove detachable side frames in the enclosure to obtain such a breeze. Thus, the driver achieves his desired ventilation and the interior of the boat is protected by the clear view hard curtain 30 in the front of the boat.

Figure 5:
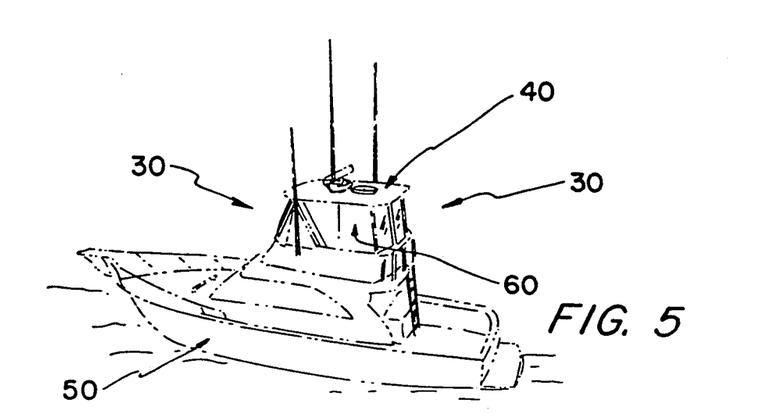
FIG. 5 illustrates the clear view hard curtain in connection with the previous clear acrylic sheet, and thereby used for a bridge enclosure on a boat.

In another preferred embodiment of the present invention, as shown in FIG. 5, the clear view hard curtain 30 may be employed on the bridge 40 of a boat 50 in connection with the existing clear vinyl cover 60. It may further be employed on the aft of a boat (not shown). It may further be utilized to cover other portions on any number of types of other boats. For example, the clear view hard curtain 30 may be utilized as a bimany (a convertible top which is flexible and easily stored) in certain boats and can be used as a dodger in an enclosure for a sailboat. Finally, the clear view hard curtain 30 is easily adaptable and may be utilized as a type of T-top or sunshade in connection with poles set up to support the curtain.

In utilizing the clear view hard curtain 30 in connection with an existing clear vinyl cover 60, the clear view hard curtain 30 may be used to replace any select portion of the vinyl cover 60. For example, a user may desire to employ the frames of the clear view hard curtain 30 to cover the front of the bridge of the boat to provide increased visibility for the driver (as shown in FIGS. 3 and 4, for example). To do so, the user need merely remove a section of the existing clear vinyl cover 60 and replace it with 3 frames 10 of the Clear view hard curtain. Further, the clear view hard curtain frames may be utilized as side or back covers replacing the existing clear vinyl cover 60. Thus, for a small expense, the user may still receive the benefits of the clear view hard curtain 30 in that any number of frames 10, being small and portable and easily attachable to existing vinyl, may be used to replace Portions of the existing vinyl cover 60. As shown in FIG. 5, the frames 10 of the clear view hard curtain are utilized to replace the front and rear portions of the existing vinyl cover with the clear vinyl cover 60 remaining to cover the side portions of the bridge 40 of the boat 50.

The acrylic panels 1 may be waxed such that water coming into contact with the panels will then bead and easily fall off. Such waxing of the surface of the curtain was not possible previous clear vinyl curtains. Further, any scratches occurring on the surface of the acrylic may be buffed to further maintain a high level of visibility for a user inside of a boat viewing out. Various antistatic or anti-fog cleaners may be applied to the acrylic panels, and further the panels being of a flat surface, may be easily cleaned whereas the salt water from the ocean had a tendancy to scratch the previous clear vinyl curtains.

The clear view hard curtain of the present invention may have various uses beyond that of the boat enclosures and covers previously described. The curtain is not limited to protecting boat interiors from various natural elements and is further not limited to vehicles such as boats. Further, the compactability and separability of the frames of the curtain allow for easy storage without damage to the curtain. Each of the frames may be stored separately or may be folded in an accordion-like manner to allow for a compact, easily transportable boat cover.

From the above described embodiments of the present invention, it is apparent that the present invention may be modified as would occur to one of ordinary skill in the art without departing from the spirit and scope of the present invention which should be defined solely by the appendent claims. Changes and modifications of the system contemplated by the present preferred embodiments will be apparent to one of ordinary skill in the art.

What is claimed is:

1. An apparatus for protecting a boat having an interior and exterior from various natural elements including rain and sea water, possessing high visibility and external noise reduction, the apparatus comprising;
    transparent semi-rigid panel means, having a clear, flat surface for protecting said boat interior and for maintaining excellent visibility from the boat interior to the surrounding exterior;
    flexible framing means, attached to and surrounding said transparent semi-rigid panel means, for encasing said transparent semi-rigid panel means and for absorbing shock thereto, said flexible framing means having two opposing sides;
    selectively detachable fastening means, attached to said flexible framing means along said two opposing sides, for attaching each of said two opposing sides of said flexible framing means directly to said boat, thereby forming a cover for said boat interior, and for being selectively detachable for selectively detaching each of said two opposing sides of said flexible framing means from said boat, the transparent apparatus thereby providing a substantially clear, transparent protective apparatus.

2. An apparatus, as claimed in claim 1, wherein said apparatus is maintained while said boat is moving.

3. An apparatus, as claimed in claim 1, wherein said transparent semi-rigid panel means comprises at least one clear acrylic panel.

4. An apparatus, as claimed in claim 1, wherein said flexible framing means comprises vinyl material.

5. An apparatus for protecting a vehicle having an interior and exterior from natural elements, comprising:
    a plurality of flexible, transparent frames, comprising,
    a plurality of transparent, planer viewing means, each substantially semi-rigid and made of a first material, for allowing a user to view out from the vehicle interior, and
    flexible framing means, made of a second material, attached to and encasing each of said semi-rigid transparent, planer viewing means, for forming a flexible border around each semi-rigid transparent planer viewing means;
    means for fastening said plurality of flexible transparent frames together so as to collectively form a protective vehicle cover having two opposing sides; and
    selectively detachably fastening means, attached to said protective vehicle cover along said two opposing sides, for fastening each of said two opposing sides of said protective vehicle cover directly to a vehicle so as to protect said vehicle interior from natural elements, and for being selectively detachable for selectively unfastening each of said two opposing sides of said protective vehicle cover from said vehicle, each of the plurality of semi-rigid transparent, planer viewing means forming a majority of the surface area of each of the plurality of flexible, transparent frames.

6. An apparatus, as claimed in claim 5, wherein said means for fastening said plurality of flexible, transparent frames together comprise snapping together said flexible, framing means by means of snaps.

7. An apparatus, as claimed in claim 5, wherein said means for fastening said plurality of flexible, transparent frames together comprises a zipping means for zipping said frames together.

8. An apparatus, as claimed in claim 5, wherein said means for fastening said plurality of flexible, transparent frames together comprises stitching said frames together.

9. An apparatus, as claimed in claim 5, wherein said means for fastening said plurality of flexible, transparent frames together comprises zipping means for fastening some of said flexible, transparent frames together and snaps for fastening other of said flexible, transparent frames together.

10. An apparatus, as claimed in claim 5, wherein said means for fastening said Plurality of flexible, transparent frames together comprises zipping means for fastening some of said flexible, transparent frames together and stitching other of said flexible transparent frames together.

11. An apparatus, as claimed in claim 5, wherein said means for fastening said plurality of flexible, transparent frames together comprises snaps for snapping said frames together and stitching other of said frames together.

12. An apparatus, as claimed in claim 5, wherein said means for fastening said plurality of flexible, transparent frames together comprises zipping means for fastening some of said flexible, transparent frames together, snaps for snapping other of said frames together, and stitching other of said frames together.

13. An apparatus, as claimed in claim 5, wherein said second material comprises a vinyl material.

14. An apparatus, as claimed in claim 5, wherein said first material comprises an acrylic material.

15. An apparatus, as claimed in claim 5, further comprising:
    hinging means, attached between one or more pairs of said plurality of flexible, transparent frames, for creating a hinge between two or more of said flexible, transparent frames allowing movement of a select portion of said cover relative to the remainder of said cover.

16. An apparatus, as claimed in claim 15, wherein said hinging means hinges two flexible transparent frames covering the front of the boat, thereby allowing a driver of the boat to open one of said flexible, transparent frames while maintaining the remainder of said cover, to further increase visibility.

17. An apparatus, as claimed in claim 5, wherein at least one of said plurality of flexible, transparent frames is selectively detachable and may be selectively removed by a user.

18. An apparatus, as claimed in claim 5, wherein said transparent, planer viewing means are tinted so as to reduce the amount of sunlight entering into the interior of the vehicle.

19. An apparatus, as claimed in claim 5, wherein said vehicle is a boat and said protective vehicle cover is a boat cover.

20. An apparatus, as claimed in claim 5, wherein said fastening means comprise snaps.

21. A selectively removable enclosure for protecting a previously unenclosed interior portion of a vehicle, having an interior and exterior, from external elements, said enclosure comprising;
   a plurality of substantially rigid individual frames, each frame, having two opposing sides, including,
   substantially rigid, planer protecting means for protecting said previously unenclosed interior portion of said vehicle from external elements,
   flexible partitioning means, attached to and surrounding each of said protecting means for providing a flexible, shock absorbing frame encasing each of said substantially rigid protecting means;
   selectively detachable fastening means, attached to each of said individual frames along said two opposing sides; for attaching each of said two opposing sides of each of said individual frames directly to said vehicle and for being selectively detachable for detaching each of said two opposing sides of each of said individual frames from said vehicle; and
   means for fixably attaching a plurality of said individual frames together;
   means for nonfixably attaching a plurality of said individual frames together, wherein said nonfixably attached frames allow only a selected portion of said enclosure to be maintained,
   said substantially rigid planer protecting means forming a majority of the surface area of each of the individual frames.

22. An enclosure, as claimed in claim 21, wherein said means for fixably attaching a plurality of said individual frames together comprises a hinging means for allowing the unfastening and opening of one individual frame while maintaining the fastening of a second, fixably attached frame.

23. An enclosure, as claimed in claim 22, wherein said hinging means is located between frames at the front of the vehicle, to allow a driver to detach a portion of said enclosure to increase visibility, while not having to completely remove one or more of said plurality of individual frames.

24. An enclosure, as claimed in claim 21, wherein said rigid, planer protecting means comprise an acrylic material.

25. An enclosure, as claimed in claim 21, wherein said flexible partitioning means comprises a vinyl material.

26. An enclosure, as claimed in claim 21, which is maintained while a vehicle is moving.

27. An enclosure, as claimed in claim 26, wherein said vehicle is a boat.

28. An enclosure, as claimed in claim 27, wherein said enclosure encloses the bridge of said boat.

29. An enclosure, as claimed in claim 27, wherein said enclosure encloses the aft of said boat.

30. An enclosure, as claimed in claim 21, wherein said rigid, planer protecting means are transparent.

31. An enclosure, as claimed in claim 21, wherein said means for nonfixably attaching a plurality of said individual frames together comprises a zipper.

32. An enclosure, as claimed in claim 21, wherein said means for nonfixably attaching a plurality of said individual frames together comprises snaps.

33. An enclosure, as claimed in claim 21, wherein said fastening means comprises snaps.

34. An enclosure, as claimed in claim 21, wherein said vehicle is a tractor.

35. An enclosure, as claimed in claim 34, wherein said rigid, planar protecting means comprises a polycarbonate resin material.

36. A compactable vehicle enclosure system which provides a vehicle protection from external elements and is capable of being folded to be stored in a small area and unfolded without incurring a loss in visibility when again placed on the vehicle, said system comprising:
   a plurality of flexible, transparent frames capable of being folded in an accordion-like fashion, each frame comprising:
      a substantially rigid, transparent planar protecting means for protecting said vehicle from said external elements and for providing a user of the vehicle a high level of visibility through the transparent planar surface;
      flexible framing means, attached to and surrounding said protecting means, for
   providing a flexible shock-absorbing frame encasing said protecting means;
   fastening means for attaching each of said plurality of flexible, transparent frames to said vehicle;
   attaching means for attaching each of said flexible, transparent frames together so as to form said enclosure system, wherein said attaching means provides the compactable, accordion-like folding of said enclosure system and provides for the unfolding of said folded enclosure wherein said rigid, transparent planer protecting means stay rigid and thus maintain their high level of visibility when said enclosure system is again utilized;
   said substantially rigid, transparent planar protecting means forming a majority of the surface area of each frame.

37. A system, as claimed in claim 36, wherein said flexible framing means comprises a vinyl material.

38. A system, as claimed in claim 36, wherein said substantially rigid transparent planer protecting means comprises an acrylic material.

39. A system, as claimed in claim 36, wherein said vehicle is a boat with an interior and an exterior.

40. A system, as claimed in claim 39, wherein said system is utilized on said boat when said boat is moving, said flexible framing means thereby absorbing the shock, to said rigid, transparent, planer protecting means, caused by contact of the boat to water.

41. A system, as claimed in claim 40, wherein said flexible framing means also serves as an insulating means while said boat is moving, insulating the interior of the boat from external noise.

42. A system, as claimed in claim 36, wherein said vehicle is a tractor.

43. A system, as claimed in claim 42, wherein said rigid, transparent, planer protecting means comprises a polycarbonate resin material.

44. A method for constructing a vehicle cover for protecting a vehicle having an interior and an exterior from natural elements, comprising the steps of:
   a) forming transparent semi-rigid panels;
   b) encasing said transparent semi-rigid panels in a flexible frame, made of flexible material having a smooth and rough side, by
      1) folding said flexible material in half so as to form a smooth top side and a smooth bottom side,
      2) stitching said folded material at the midpoint so as to form a closed end and an open end,
      3) folding both the top portion of the open end and the bottom portion of the open end of said stitched material, in half, and stitching each fold so as to form a pocket consisting of a top portion and a bottom portion, both portions having a smooth top side and a smooth bottom side, and,
      4) glueing one of said transparent semi-rigid panels into said formed pocket thereby encasing a portion of said transparent semi-rigid panel in a flexible frame,
      5) repeating steps 1-4 to completely encase each of said semi-rigid panels in a flexible frame thereby forming said protective vehicle cover, said semi-rigid panels forming a majority of the surface area in each flexible frame and thus in said protective vehicle cover.

45. A method, as claimed in claim 44, wherein said cover is a boat cover.

46. A method, as claimed in claim 44, wherein said semi-rigid panels comprise acrylic material.

47. A method, as claimed in claim 44, wherein said flexible material comprises a vinyl material.

48. The apparatus of claim 1, wherein said selectively detachable fastening means, attached to said flexible framing means, completely surrounds said transparent semi-rigid panel means.

49. The apparatus of claim 5, wherein said selectively detachable fastening means, attached to said protective cover, completely surrounds said protective vehicle cover so as to fasten said protective vehicle cover to a vehicle.

50. The apparatus of claim 1 wherein said transparent semi-rigid panel means and said flexible framing means form a first surface area and said transparent-semi-rigid panel defines substantially all of the first surface area except for a minor portion defined by the flexible framing means so that the apparatus provides for a large area of visibility relative to the surface area.

* * * * *